United States Patent
Lee et al.

(10) Patent No.: US 9,263,945 B2
(45) Date of Patent: Feb. 16, 2016

(54) CONSTANT ON TIME CONTROL CIRCUIT AND DC-DC CONVERTING CIRCUIT

(71) Applicant: GREEN SOLUTION TECHNOLOGY CO., LTD., New Taipei (TW)

(72) Inventors: Li-Min Lee, New Taipei (TW); Chao Shao, Wuxi (CN); Shian-Sung Shiu, New Taipei (TW); Quan Gan, Wuxi (CN)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 292 days.

(21) Appl. No.: 13/893,333

(22) Filed: May 13, 2013

(65) Prior Publication Data

US 2014/0197812 A1 Jul. 17, 2014

(30) Foreign Application Priority Data

Jan. 11, 2013 (CN) .......................... 2013 1 0012117

(51) Int. Cl.
*H02M 1/14* (2006.01)
*H02M 3/158* (2006.01)
*H02M 3/156* (2006.01)
*H02M 1/00* (2007.01)

(52) U.S. Cl.
CPC ............ *H02M 3/1563* (2013.01); *H02M 1/143* (2013.01); *H02M 3/1588* (2013.01); *H02M 2001/0019* (2013.01)

(58) Field of Classification Search
CPC ............. H02M 2001/0003; H02M 2001/0016; H02M 1/143; H02M 3/156; H02M 3/1563; H02M 3/1588
See application file for complete search history.

(56) References Cited

U.S. PATENT DOCUMENTS

| | | | |
|---|---|---|---|
| 5,994,885 A | 11/1999 | Wilcox et al. | |
| 6,369,555 B2 | 4/2002 | Rincon-Mora | |
| 7,482,793 B2 | 1/2009 | Stoichita | |
| 8,441,239 B2* | 5/2013 | Miyamae | 323/271 |
| 2009/0066309 A1* | 3/2009 | Nishida | 323/288 |
| 2010/0308784 A1* | 12/2010 | Scoones et al. | 323/282 |
| 2011/0127985 A1* | 6/2011 | Tsai et al. | 323/285 |

(Continued)

FOREIGN PATENT DOCUMENTS

| | | |
|---|---|---|
| CN | 101145732 A | 3/2008 |
| CN | 101540585 A | 9/2009 |

(Continued)

*Primary Examiner* — Fred E Finch, III
(74) *Attorney, Agent, or Firm* — CKC & Partners Co., Ltd.

(57) ABSTRACT

A constant on time control circuit, configured to control a converting circuit to transform an input voltage into a stable output voltage, is disclosed. The constant on time control circuit comprises a comparing circuit and a logic circuit. The comparing circuit compares a reference signal and a voltage signal indicative of the output voltage and accordingly outputs a compared result signal. The logic circuit periodically controls the converting circuit to perform voltage transformation and makes a time period of a duty cycle in every cycle being substantially constant. A start point in time of every cycle is determined according to the compared result signal. The comparing circuit comprises a differential pair, a base current source and an extra current source. The base current source provides a bias current to the differential pair. The extra current source provides a substantial ramp current to one channel in the differential pair.

8 Claims, 10 Drawing Sheets

(56) References Cited

U.S. PATENT DOCUMENTS

| | | | |
|---|---|---|---|
| 2011/0241639 A1* | 10/2011 | Noda | 323/282 |
| 2012/0146609 A1* | 6/2012 | Seki | 323/284 |
| 2013/0038313 A1* | 2/2013 | Gotoh | 323/288 |
| 2013/0141059 A1* | 6/2013 | Parkhurst et al. | 323/271 |
| 2013/0300392 A1* | 11/2013 | Laur et al. | 323/284 |

FOREIGN PATENT DOCUMENTS

| | | |
|---|---|---|
| CN | 101610024 B | 5/2012 |
| TW | I246821 B | 1/2006 |
| TW | 201110518 A | 3/2011 |
| TW | 201121221 A | 6/2011 |

* cited by examiner

CONSTANT ON TIME CONTROL CIRCUIT AND DC-DC CONVERTING CIRCUIT

RELATED APPLICATIONS

This application claims priority to Chinese Application Ser. No. 201310012117.7, filed Jan. 11, 2013, which is herein incorporated by reference.

BACKGROUND OF THE INVENTION (1) Field of the Invention

The invention relates to a constant on time control circuit and a DC to DC converting circuit.

(2) Description of the Prior Art

FIG. 1 is a schematic diagram of a DC to DC converting circuit with low voltage ripple and high frequency hysteretic disclosed in U.S. Pat. No. 6,369,555. The DC to DC converting circuit comprises a buffer circuit 2, a hysteresis comparator 4, a feedback circuit 6 and a driving circuit 8. The feedback circuit 6 is coupled to an output end of the hysteresis comparator 4 and provides a feedback signal $V_{RAMP}$. The input end of the buffer circuit 2 receives a superimposed signal $V_{REF}'$ of the feedback signal $V_{RAMP}$ and a reference signal $V_{REF}$, i.e., $V_{REF}'=V_{REF}+V_{RAMP}$. Input ends of the hysteresis comparator 4 are respectively coupled to an output end of the buffer circuit 2 and an output voltage $V_{OUT}$, and the output end thereof is coupled to the driving circuit 8. The driving circuit 8 may be a power transistor, coupled to an input voltage $V_{IN}$ and an LC filter 12. The LC filter 12 provides the output voltage $V_{OUT}$.

Because the noise affects the limit of detecting voltage, a hysteresis window of the hysteresis comparator 4 must be setting wider. Thus, the voltage ripple on the output voltage $V_{OUT}$ can't be eliminated, and particularly the voltage ripple is more obvious with the output voltage $V_{OUT}$ being lower.

The constant on time control loop is another new feedback control mechanism. The constant on time control loop superimposes a voltage ripple generated by an equivalent series resistance (ESR) of the output capacitance into the feedback signal to inhibit the voltage ripple on the output voltage. Therefore, the output capacitance for the constant on time control loop must be provided with the bigger equivalent series resistance, and an operation frequency thereof can't be set high.

For solving the above mentioned problems, the U.S. Pat. No. 7,482,793 discloses a DC to DC converting circuit with constant on time and minimum off-time feedback control loop. FIG. 2 is a schematic diagram of a DC to DC converting circuit of the U.S. Pat. No. 7,482,793. The DC to DC converting circuit comprises a buck converting controller 100 and is coupled to an LC filter. The buck converting controller 100 receives an input voltage $V_{IN}$ at a terminal end 102, and provides a switching output voltage $V_{SW}$ at a terminal end 104 to the LC filter that is composed by an inductance L1 and an output capacitance $C_{OUT}$. The LC filter generates an output voltage $V_{OUT}$ at a terminal end 114 for driving a load 116. The output capacitance $C_{OUT}$ has a smaller equivalent series resistance ESR. The buck converting controller 100 executes the feedback control with the constant on time and minimum off-time feedback control loop. Power transistors M1 and M2 are coupled in series between the input voltage $V_{IN}$ (terminal end 102) and the ground (terminal end PGND), and controlled by a driving circuit 134. A connection node 122 of the power transistors M1 and M2 generates the switching output voltage $V_{SW}$, and is coupled to the LC filter through a terminal end SW. The buck converting controller 100 has two separate ground connection terminal ends PGND and SGND for avoiding the noise due to the switching of the power transistors M1 and M2.

The output voltage $V_{OUT}$ is coupled to a voltage divider comprised with resistors R1 and R2 through a terminal end FB. The voltage divider generates a feedback voltage $V_{FB}$ to an input end of an error comparator 126 for forming a feedback control loop, and so the buck converting controller 100 switches the power transistors M1 and M2 in response to the feedback voltage $V_{FB}$. A voltage reference circuit 136 is coupled to the input voltage and provides a reference signal $V_{REF}$ to the other input end of the error comparator 126. The error comparator 126 compares the reference signal $V_{REF}$ and the feedback voltage $V_{FB}$ and accordingly generates an error voltage signal $V_{ERR}$. The error voltage signal $V_{ERR}$ is coupled to a starting end Start of an On timer 128 for starting the On process of the On timer 128. At this time, the On timer 128 provides a control signal 129 to a logic circuit 132, and so the logic circuit 132 turns on the power transistor M1 for a constant on time period through the driver 134 for raising the current of the inductance L1. After the power transistor M1 is turned on for the constant on time, the On timer 128 controls the logic circuit 132 through the driver 134 to cutoff the power transistor M1 and turn on the power transistor M2.

For executing the minimum off time control, the On timer 128 provides an end signal at an ending output end End to a starting end Start of an Off timer 130. The Off timer 130 starts the Off time process when the On-time duration expires, and provides an ending signal to the logic circuit 132 to indicate the end of the off-time duration. If the feedback voltage VFB is lower than the reference signal $V_{REF}$ at this time, the logic circuit 132 immediately turns on the power transistor M1 again.

The buck converting controller 100 comprising a ripple injection circuit 120, which is coupled between the switching output voltage $V_{SW}$ (terminal end 122) and the feedback voltage $V_{FB}$ (terminal end FB). A feed-forward capacitance $C_{FF}$ is connected to the output voltage $V_{OUT}$ (the terminal end 114) and the ripple injection circuit 120 (terminal end FFWD). By the above-mentioned circuit structure, a given amount of ripple is injected into the feedback control loop and so the resistance value of the equivalent series resistance of the output capacitance is unlimited.

Although the DC to DC converting circuit with the constant on time shown in FIG. 2 injects ripple into the feedback control loop for ripple compensation, and so the operation frequency can be set high and the MLCC having a smaller equivalent series resistance can be used in the converting circuit. However, the direct current components in the output voltage $V_{OUT}$ have a certain offset voltage due to injecting ripple into the terminal end FFWD. When the output voltage Vout is lower, an influence of the DC offset voltage is especially serious.

SUMMARY OF THE INVENTION

In view of problems of the conventional DC to DC converting circuit, such as the voltage ripple being too large or the DC offset voltage, the invention injects an extra current to one channel of the differential pair to reach the effect of ripple compensation and avoid the direct current offset voltage.

To accomplish the aforementioned and other objects, an exemplary embodiment of the invention provides a constant on time control circuit, adapted to control a converting circuit to transform an input voltage into an output voltage. The constant on time control circuit comprises a comparing circuit and a logic circuit. The comparing circuit compares a reference signal and a voltage signal indicative of the output voltage and accordingly outputs a compared result signal. The logic circuit periodically controls the converting circuit to perform the voltage transformation and makes a time period of a duty cycle in every cycle being substantially constant, wherein a start point in time of every cycle is determined according to the compared result signal. Wherein, the comparing circuit comprises a differential pair, a base current source and an extra current source. The base current source provides a bias current for the differential pair which compares the reference signal and the voltage signal to output the compared result signal. The extra current source provides a substantial ramp current to one channel in the differential pair.

The invention also provides a DC to DC converting circuit, comprising a switching module, an LC filter and a control circuit. The switching module is coupled to an input voltage. The LC filter is coupled to the switching module and outputs an output voltage. The control circuit periodically controls the switching module and transfers an electrical power to the LC filter. The control circuit comprises a comparing circuit which compares a reference signal and a voltage signal indicative of the output voltage and accordingly outputs a compared result signal for determining a start point in time in every cycle. Wherein, the comparing circuit has a differential pair. One channel of the differential pair is coupled to an extra current source to receive a substantial ramp current.

It is to be understood that both the foregoing general description and the following detailed description are exemplary, and are intended to provide further explanation of the invention as claimed. In order to make the features and the advantages of the invention comprehensible, exemplary embodiments accompanied with figures axe described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
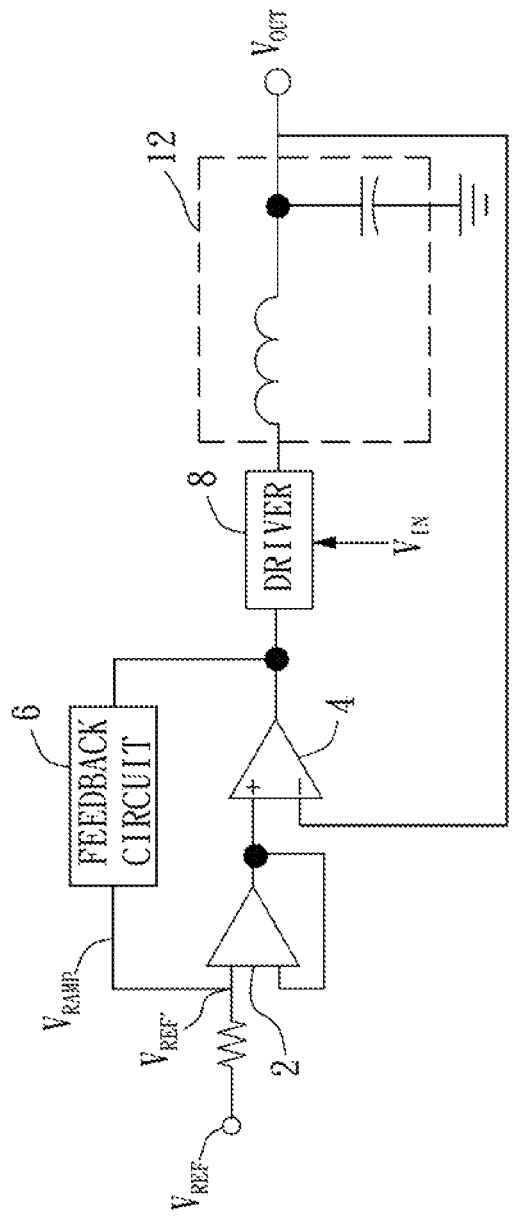
FIG. 1 is a schematic diagram of a DC to DC converting circuit with low voltage ripple and high frequency hysteresis of U.S. Pat. No. 6,369,555.
Figure 2:
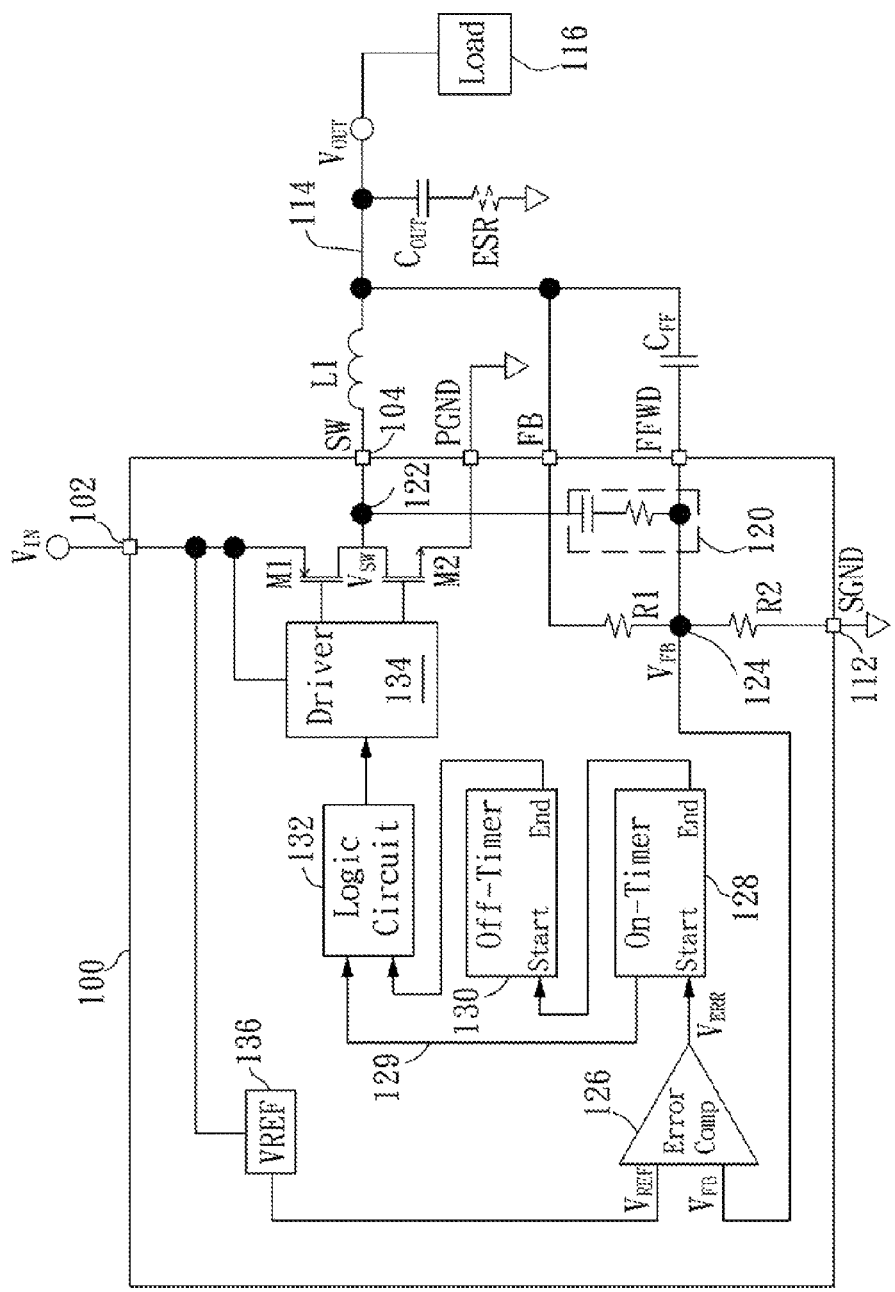
FIG. 2 is a schematic diagram of the DC to DC converting circuit of the U.S. Pat. No. 7,482,793.
Figure 3:
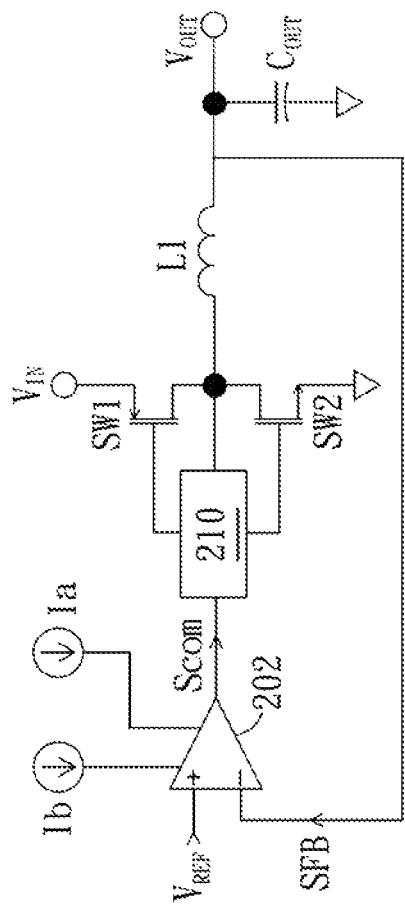
FIG. 3 is a schematic diagram of a constant on time control circuit according to a first preferred embodiment of the present invention.

FIG. 3 is a schematic diagram of a constant on time control circuit according to a first preferred embodiment of the present invention. The constant on time control circuit is adapted to control a converting circuit for transforming an input voltage $V_{IN}$ into an output voltage $V_{OUT}$. In the present embodiment, the converting circuit is a buck converting circuit, which comprises a switching module and an LC filter. The switching module comprises an upper transistor SW1 and a lower transistor SW2. The LC filter comprises an inductance L1 and an output capacitance $C_{OUT}$. The constant on time control circuit comprises a comparing circuit 202 and a logic circuit 210. The comparing circuit 202 compares a reference signal $V_{REF}$ and a voltage signal SFB indicative of the output voltage $V_{OUT}$ and accordingly outputs a compared result signal Scom. The logic circuit 210 periodically controls the converting circuit to perform the voltage transformation. The logic circuit 210 has a build-in constant on time circuit (not shown) which makes an On-time period of a duty cycle in every cycle being substantially constant. During the On-time period in every cycle, the logic circuit 210 turns on the upper transistor SW1 and turns off the lower transistor SW2 for transferring an electrical power of the input voltage into the LC filter. And then, the logic circuit 210 turns off the upper transistor SW1 and turns on the lower transistor SW2 for waiting next cycle (the compared result signal Scom). At this time, the logic circuit 210 simultaneously detects a current of the inductance L1. When the current of the inductance L1 is zero or close to zero, the lower transistor SW2 is cut off for avoiding a reverse current occurring. A non-inverting input end of the comparing circuit 202 receives the reference signal $V_{REF}$, and an inverting input end thereof receives the voltage signal SFB. When the voltage signal SFB is equal or lower than the reference signal $V_{REF}$, the comparing circuit generates the compared result signal Scom. The logic circuit 210 decides a start point in time of every cycle according to the compared result signal Scom. It is preferred to be a start point in time of the On-time period.

Figure 4:
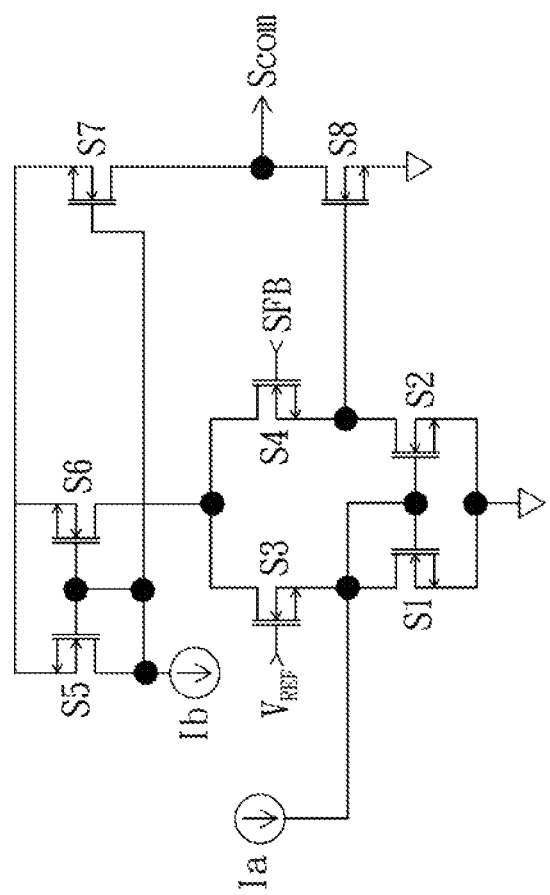
FIG. 4 is a schematic diagram of a comparing circuit according to a first preferred embodiment of the present invention.

The comparing circuit has two current sources of a base current source Ib and an extra current source Ia. FIG. 4 is a schematic diagram of a comparing circuit according to a first preferred embodiment of the present invention. The comparing circuit comprises a differential pair, an inverter, a base current source Ib and an extra current source Ia. The differential pair comprises transistors S1-S6. The inverter comprises transistors S7 and S8. The inverter comprises the transistors S7 and S8. The inverter isn't a necessary element in practical application and may be omitted. The base current source Ib provides a bias current for the differential pair. The transistor S3 receives a reference signal $V_{REF}$, and the transistor S4 receives a voltage signal SFB. A connection node of the transistors S2 and S4 is coupled to the transistor S8 of the inverter. The differential pair has two channels, and the extra current source Ia provides a substantial ramp current to a left side channel of the differential pair in the present embodiment. In a conventional comparing circuit, when the voltage signal SFB is lower than the reference signal $V_{REF}$, the electric potential of the connection node of the transistors S2 and S4 is a low level to turn off the transistor S8 and so the comparing circuit outputs a high-level compared result signal Scom. When the voltage signal SFB is higher than the reference signal $V_{REF}$, the electric potential of the connection node of the transistors S2 and S4 is a high level to turn on the transistor S8 and so the comparing circuit outputs a low-level compared result signal Scom.

Figure 5:
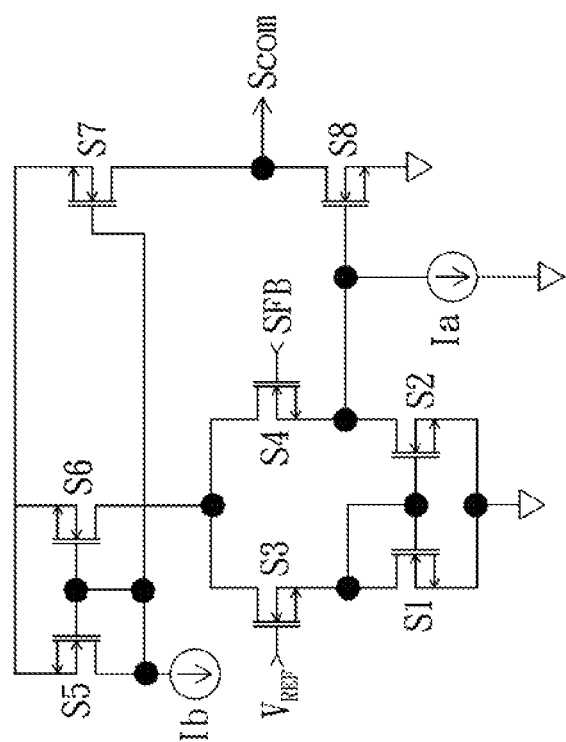
FIG. 5 is a schematic diagram of a comparing circuit according to a second preferred embodiment of the present invention.

The extra current source Ia of the present invention can be couple to any one channel of the differential pair. FIG. 5 is a schematic diagram of a comparing circuit according to a second preferred embodiment of the present invention. Compared with the embodiment shown in FIG. 4, the extra current source Ia which is coupled to the other channel of the differential pair in the present embodiment (i.e. the left side channel) still provides the same function.

Figure 6:
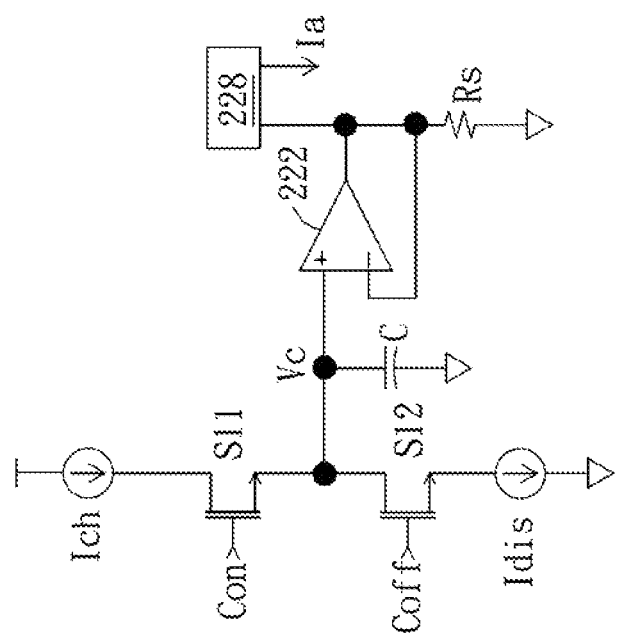
FIG. 6 is a schematic diagram of an extra current source according to a first preferred embodiment of the present invention.

FIG. 6 is a schematic diagram of an extra current source according to a first preferred embodiment of the present invention. The extra current source comprises a charging current source Ich, a discharging current source Idis, a charging switch S11, a discharging switch S12, a capacitance C, a transconductance circuit 222, a current setting resistor Rs and a current mirror 228. A current ratio of the charging current source Ich and the discharging current source Idis is equal to a voltage ratio of the output voltage $V_{OUT}$ and the input voltage $V_{IN}$. The charging switch S11 receives an on-timing signal Con of the logic circuit 210, and the on-timing signal Con indicates that the logic circuit 210 operates during the On-time period of the cycle, i.e. the period of the upper transistor SW1 being turned on. The discharging switch S12 receives an off-timing signal Coff of the logic circuit 210, and the off-timing signal Coff indicates that the logic circuit 210 operates out the On-time period, i.e. the period of the upper transistor SW1 being cut off. When the on-timing signal Con turns on the charging switch S11 the charging current source Ich charges the capacitance C (on this moment, the discharging switch S12 is cut off), and so a voltage Vc of the capacitance C is raised. When the off-timing signal Coff turns the discharging switch S12 on, the discharging current source Idis discharges the capacitance C (on this moment, the charging switch S11 is cut off), and so the voltage Vc of the capacitance C is lowered. An input end of the transconductance circuit 222 is coupled to the capacitance C, and provides a current flowing through the current setting resistor Rs according to the voltage Vc of the capacitance C. The current mirror 228 generates an extra current source Ia in response to the current flowing through the current setting resistor Rs. Thus, the extra current source Ia can provide a substantial ramp current, which increases when the upper transistor SW1 is turned on and reduces when the upper transistor SW1 is cut off.

Figure 7:
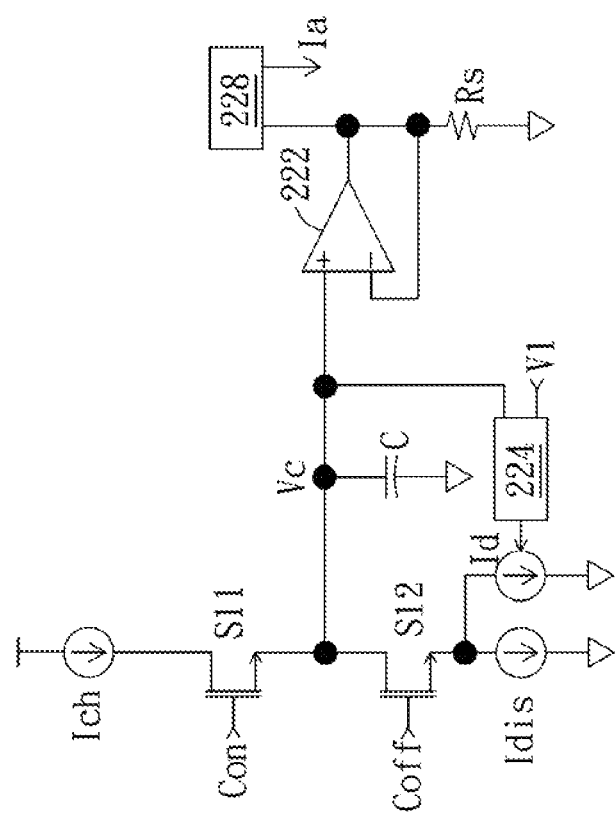
FIG. 7 is a schematic diagram of an extra current source according to a second referred embodiment of the present invention.
Figure 8:
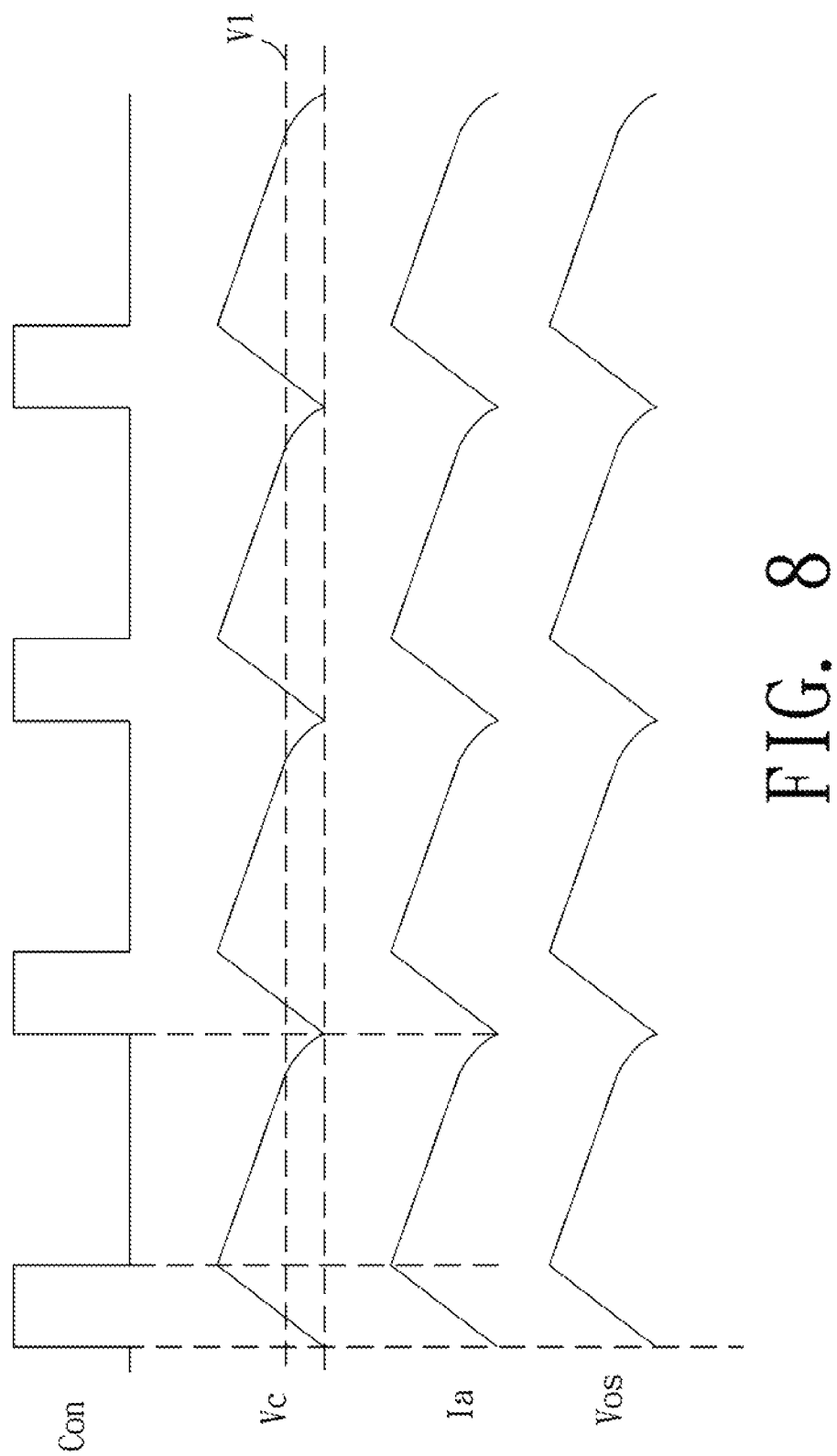
FIG. 8 is a graph showing signal waveforms of the extra current source shown in FIG. 7.

FIG. 7 is a schematic diagram of an extra current source according to a second referred embodiment of the present invention. Compared with the embodiment shown in FIG. 6, a controlled discharging current source Id and a current control circuit 224 are added. When the voltage Vc of the capacitance C is lower than a current reference voltage V1, the current control circuit 224 controls the controlled discharging current source Id to generate a discharging current and the amount of the discharging current depends on the voltage difference of the voltage Vc and the current reference voltage V1. FIG. 8 is a graph showing signal waveforms of the extra current source shown in FIG. 7. The voltage Vc of the capacitance C varies i.e., increases and decreases, in response to the on-timing signal Con. In the decreasing duration, the controlled discharging current source Id starts to discharge the capacitance C together when the voltage Vc of the capacitance C is lower than the current reference voltage V1. Furthermore, the discharging current of the controlled discharging current source Id increases with the voltage Vc of the capacitance C lowering. Hence, the voltage Vc nonlinearly varies during the decreasing duration before the end point in time of the cycle, and correspondingly the extra current source Ia also generates a nonlinear current. A periodic rate of the nonlinear zone of the extra current source Ia in the cycle can be adjusted by the current reference voltage V1. The extra current source Ia provides a current to one channel of the differential pair and so an offset voltage Vos occurs when comparing the reference signal $V_{REF}$ and the voltage signal SFB. The offset voltage Vos also appears a nonlinear variation before the end point in time of every cycle. Therefore, an angle formed by the offset voltage Vos and a horizon line increases to reduce the influences of the noises in the comparing circuit. In other words, compared to the conventional circuit, the constant on time control circuit of the present invention has a better antinoise ability.

Figure 9:
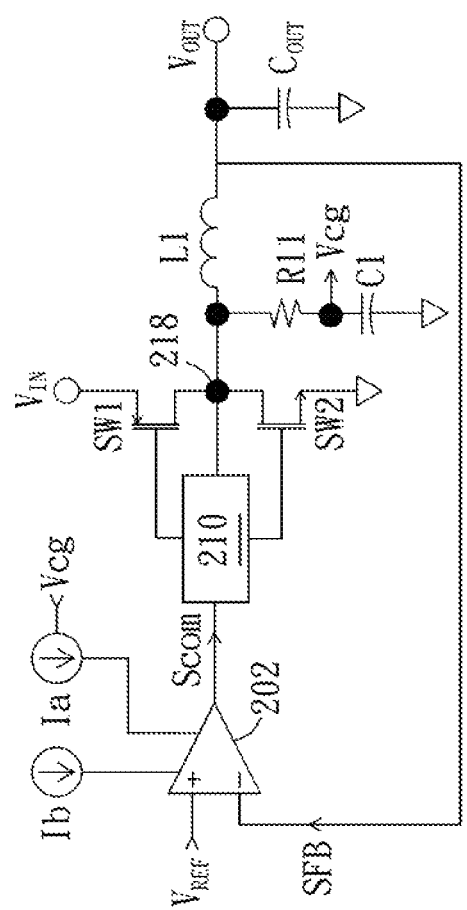
FIG. 9 is a schematic diagram of a constant on time control circuit according to a second preferred embodiment of the present invention.

FIG. 9 is a schematic diagram of a constant on time control circuit according to a second preferred embodiment of the present invention. Compared with the constant on time control circuit shown in FIG. 3, the main difference is that the current of the extra current source Ia in the present embodiment is generated according to the electric potential of a connection node 218 of the upper transistor SW1 and the lower transistor SW2. A filter, comprising by a resistor R11 and a capacitance C1, detects the connection node 218 and generates a detecting signal Vcg. The current of the extra current source Ia increases with time when the detecting signal Vcg is at a high level (close to the input voltage $V_{IN}$), and decreases with time when the detecting signal Vcg is at a low level (close to the ground voltage).

Figure 10:
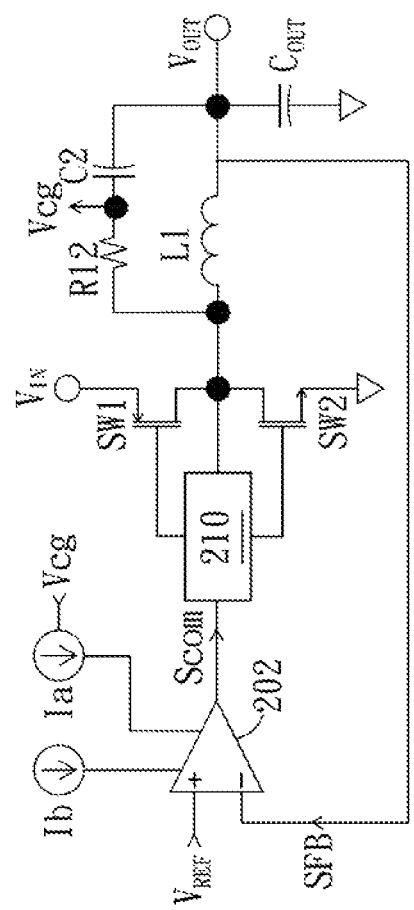
FIG. 10 is a schematic diagram of a constant on time control circuit according to a third preferred embodiment of the present invention.

FIG. 10 is a schematic diagram of a constant on time control circuit according to a third preferred embodiment of the present invention. Compared with the constant on time control circuit shown in FIG. 3, the main difference is that the current of the extra current source Ia of the present embodiment is generated according to a current flowing through the inductance L1. A current detecting circuit, comprising a resistor R12 and a capacitance C2, detects the current flowing through the inductance L1 and generates the detecting signal Vcg. The current of the extra current source Ia changes with the current flowing through the inductance.

In conclusion, the constant on time control circuit of the present invention periodically controls the switching module and transfers an electrical power of the input voltage to the LC filter for generating an output voltage. The constant on time control circuit comprises a comparing circuit which compares a reference signal and a voltage signal indicative of the output voltage and accordingly outputs a compared result signal for determining a start point in time of every cycle. It is worth noting that the comparing circuit has a differential pair and one channel thereof is coupled to an extra current source for receiving a substantial ramp current. Thus, the comparing circuit has the periodically ramp compensation to suppress the voltage ripple on the output voltage. Especially, the comparing circuit can further reduce a frequency jitter due to the influences of noises by means of a part of the substantial ramp current being nonlinear.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A constant on time control circuit, adapted to control a converting circuit to transform an input voltage into an output voltage, comprising:
   a comparing circuit, comparing a reference signal and a voltage signal indicative of the output voltage and accordingly outputting a compared result signal; and
   a logic circuit, periodically controlling the converting circuit to perform the voltage transformation and make a time period of a duty cycle in every cycle being substantially constant, wherein a start point in time of every cycle is determined according to the compared result signal;
   wherein, the comparing circuit has a differential pair, a base current source and an extra current source, the base current source provides a bias current for the differential pair which compares the reference signal and the voltage signal to output the compared result signal, and the extra current source provides a substantial ramp current to one channel in the differential pair
   wherein the extra current source comprises a capacitance, a charging current source, a discharging current source and a transconductance circuit,
   wherein a current of the discharging current source is determined according to the voltage of the capacitance.

2. The constant on time control circuit according to claim 1, wherein an absolute value of a slope of the substantial ramp current is increased with time over a predetermined period or a predetermined percentage of every cycle before an end point in time of every cycle.

3. The constant on time control circuit according to claim 2, wherein the charging current source is configured to charge the capacitance, the discharging current source is configured to discharge the capacitance, and the transconductance circuit generates the substantial ramp current according to a voltage of the capacitance.

4. The constant on time control circuit according to claim 1, wherein an absolute value of a slope of the substantial ramp current is increased with time over a predetermined period or a predetermined percentage of every cycle before an end point in time of every cycle.

5. The constant on time control circuit according to claim 4, wherein the charging current source is configured to charge the capacitance, the discharging current source is configured to charge discharge the capacitance, and the transconductance circuit generates the substantial ramp current according to a voltage of the capacitance.

6. A DC to DC converting circuit, comprising:
   a switching module, coupled to an input voltage;
   an LC filter, coupled to the switching module and outputting an output voltage; and
   a control circuit, periodically controlling the switching module and transferring an electrical power of the input voltage to the LC filter, wherein the control circuit comprises a comparing circuit which compares a reference signal and a voltage signal indicative of the output voltage and accordingly outputs a compared result signal for determining a start point in time of every cycle;
   wherein, the comparing circuit has a differential pair, and one channel of the differential pair is coupled to an extra current source to receive a substantial ramp current
   wherein the extra current source comprises a capacitance, a charging current source, a discharging current source and a transconductance circuit,
   wherein a current of the discharging current source is determined according to the voltage of the capacitance.

7. The DC to DC converting circuit according to claim 6, wherein an absolute value of a slope of the substantial ramp current is increased with time over a predetermined period or a predetermined percentage of every cycle before an end point in time of every cycle.

8. The DC to DC converting circuit according to claim 6, wherein an absolute value of a slope of the substantial ramp current is increased with time over a predetermined period or a predetermined percentage of every cycle before an end point in time of every cycle.

* * * * *